US012260809B2

(12) United States Patent
Zhang

(10) Patent No.: US 12,260,809 B2
(45) Date of Patent: Mar. 25, 2025

(54) DISPLAY PANELS INCLUDING GATE DRIVING CIRCUIT AND DISPLAY DEVICES INCLUDING THE SAME

(71) Applicant: Wuhan China Star Optoelectronics Semiconductor Display Technology Co., Ltd., Hubei (CN)

(72) Inventor: Huanxi Zhang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 18/215,933

(22) Filed: Jun. 29, 2023

(65) Prior Publication Data

US 2024/0321179 A1 Sep. 26, 2024

Related U.S. Application Data

(63) Continuation of application No. PCT/CN2023/088976, filed on Apr. 18, 2023.

(30) Foreign Application Priority Data

Mar. 28, 2023 (CN) ......................... 202310317021.5

(51) Int. Cl.
*G09G 3/3266* (2016.01)
*G09G 3/32* (2016.01)

(52) U.S. Cl.
CPC ............. *G09G 3/32* (2013.01); *G09G 3/3266* (2013.01); *G09G 2300/0426* (2013.01); (Continued)

(58) Field of Classification Search
CPC ................... G09G 3/32; G09G 3/3266; G09G 2300/0426; G09G 2310/0267; G09G 2320/0233; G09G 2320/0247
See application file for complete search history.

(56) References Cited

U.S. PATENT DOCUMENTS

2018/0190204 A1* 7/2018 Shin ..................... G09G 3/3266
2021/0125557 A1* 4/2021 Na ....................... G09G 3/3266
(Continued)

FOREIGN PATENT DOCUMENTS

CN 115312004 11/2022
CN 115662334 1/2023
(Continued)

OTHER PUBLICATIONS

International Search Report and the Written Opinion Dated Dec. 27, 2023 From the International Searching Authority Re. Application No. PCT/CN2023/088976 and Its Translation Into English. (17 Pages).

*Primary Examiner* — Adam J Snyder

(57) ABSTRACT

The present application provides a display panel and a display device. The display panel includes a display area and a non-display area, the display area including a first display partition and a second display partition arranged in a first direction; where, the display panel further includes: a substrate; a plurality of pixel driving circuits disposed on a side of the substrate and located in the display area; a gate driving circuit disposed on a side of the substrate and located in the non-display area on both sides of the display area in the first direction; a plurality of scanning lines disposed on a side of the substrate, where the gate driving circuit is electrically connected to the pixel driving circuits in the same first direction as corresponding one of the scanning lines via the corresponding scanning line.

20 Claims, 6 Drawing Sheets

(52) U.S. Cl.
CPC ............... *G09G 2310/0267* (2013.01); *G09G 2320/0233* (2013.01); *G09G 2320/0247* (2013.01)

(56) References Cited

U.S. PATENT DOCUMENTS

| | | | | |
|---|---|---|---|---|
| 2021/0327361 | A1* | 10/2021 | Park | G09G 3/3266 |
| 2022/0157239 | A1 | 5/2022 | Zhang et al. | |
| 2022/0366835 | A1* | 11/2022 | Park | G09G 3/3233 |
| 2023/0108303 | A1 | 4/2023 | Xie | |

FOREIGN PATENT DOCUMENTS

| | | | | |
|---|---|---|---|---|
| JP | 2006-243525 | | 9/2006 | |
| KR | 10-2015-0083371 | | 7/2015 | |
| KR | 10-2021-0144401 | * | 11/2021 | G09G 3/3266 |
| WO | WO 2023/006100 | | 2/2023 | |

* cited by examiner

DISPLAY PANELS INCLUDING GATE DRIVING CIRCUIT AND DISPLAY DEVICES INCLUDING THE SAME

CROSS-REFERENCE TO RELATED APPLICATION(S)

This application is a Continuation Patent Application of PCT Application No. PCT/CN2023/088976, filed on Apr. 18, 2023, which claims the benefit of priority of Chinese Patent Application No. 202310317021.5, filed on Mar. 28, 2023. The disclosures of the aforementioned applications are incorporated herein by reference in their entireties.

TECHNICAL FIELD

The present application relates to the field of display technologies, and in particular to a display panel and a display device.

BACKGROUND

A display panel, in particular a self-luminous display panel, may have been applied more and more extensive, which is shown most clearly in a mobile phone terminal and a wearable terminal, and will eventually overflow to a display field of a larger size.

However, with continuous change of a user's usage requirement, the display panel may be required to have more and more display functions.

SUMMARY

In a first aspect, the present application provides a display panel, including a display area and a non-display area, the display area including a first display partition and a second display partition arranged in a first direction, where the display panel further includes: a substrate; a plurality of pixel driving circuits disposed on a side of the substrate and located in the display area; a gate driving circuit disposed on a side of the substrate and located in the non-display area on both sides of the display area in the first direction; and a plurality of scanning lines disposed on a side of the substrate, where the gate driving circuit is electrically connected to the pixel driving circuits in the same first direction as corresponding one of the scanning lines via the corresponding scanning line; where the gate driving circuit is configured to, in a same frame, transmit a first group of gate driving signals corresponding to a first refresh frequency to ones of the pixel driving circuits in the first display partition and transmit a second group of gate driving signals corresponding to a second refresh frequency to ones of the pixel driving circuits in the second display partition, the first refresh frequency being greater than the second refresh frequency.

In a second aspect, an embodiment of the present application provides a display device comprising the display panel according to any one of the foregoing implementations.

DETAILED DESCRIPTION

To make the objectives, technical solutions, and effects of the present application more clear and definite, the present application is illustrated in detail below by referring to the accompanying drawings and illustrating the embodiments. It should be understood that the specific implementations described here are only used to explain the present application, and are not used to limit the present application.

Figure 1:
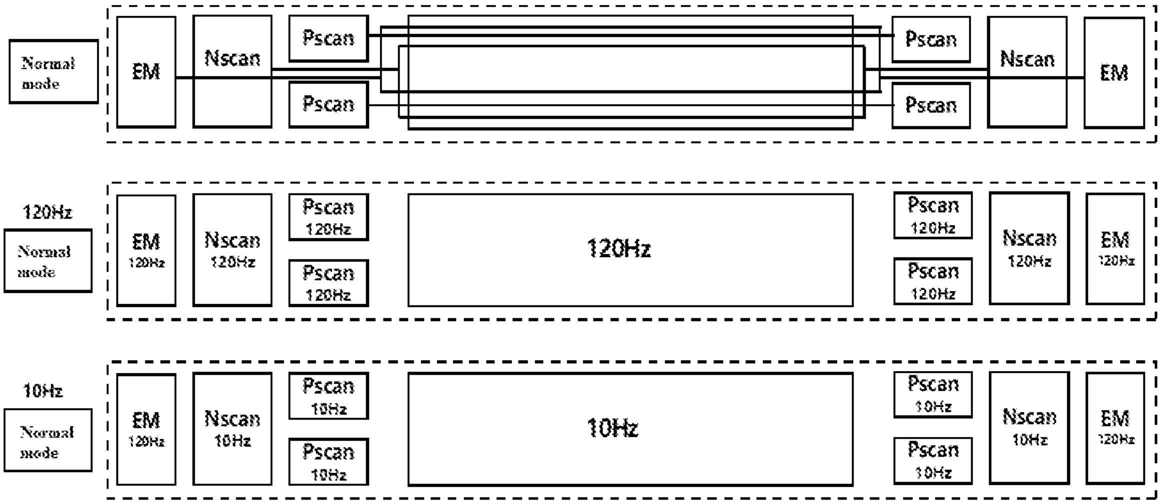
FIG. 1 is a schematic structural diagram of a display panel in the related art.

FIG. 1 is a schematic structural diagram of a display panel in the related art. When the display panel is operated in a normal (i.e., Normal) mode of the display panel, an EM gate driving circuit, an Nscan gate driving circuit, and a Pscan gate driving circuit can provide various gate driving signals corresponding to the same refresh frequency to all pixel driving circuits in a display area of the display panel, so as to control the entire display area to be displayed at the refresh frequency.

Two EM gate driving circuits are respectively located on both sides of the display area, and an output terminal of either of the EM gate driving circuits is electrically connected to two adjacent rows of pixel driving circuits via a corresponding scanning line. Two Nscan gate driving circuits are respectively located on both sides of the display area, and an output terminal of either of the Nscan gate driving circuits is electrically connected to two adjacent rows of pixel driving circuits via a corresponding scanning line. Two Pscan gate driving circuits are respectively located on both sides of the display area, and an output terminal of either of the Pscan gate driving circuits is electrically connected to a row of pixel driving circuits via a corresponding scanning line.

For example, when the EM gate driving circuits, the Nscan gate driving circuits, and the Pscan gate driving circuits provide respective gate driving signals corresponding to the refresh frequency of 120 Hz for all the pixel driving circuits in the display area, the entire display area is displayed at the refresh frequency of 120 Hz. Alternatively, when the EM gate driving circuits, the Nscan gate driving circuits, and the Pscan gate driving circuits provide respective gate driving signals corresponding to the refresh frequency of 10 Hz for all the pixel driving circuits in the display area, the entire display area can be also displayed at the refresh frequency of 10 Hz.

However, the Normal mode does not meet the requirement of displaying display partitions at different refresh frequencies, which limits the expansion of the display functions and makes it difficult to meet the requirements of different application scenarios.

Figure 2:
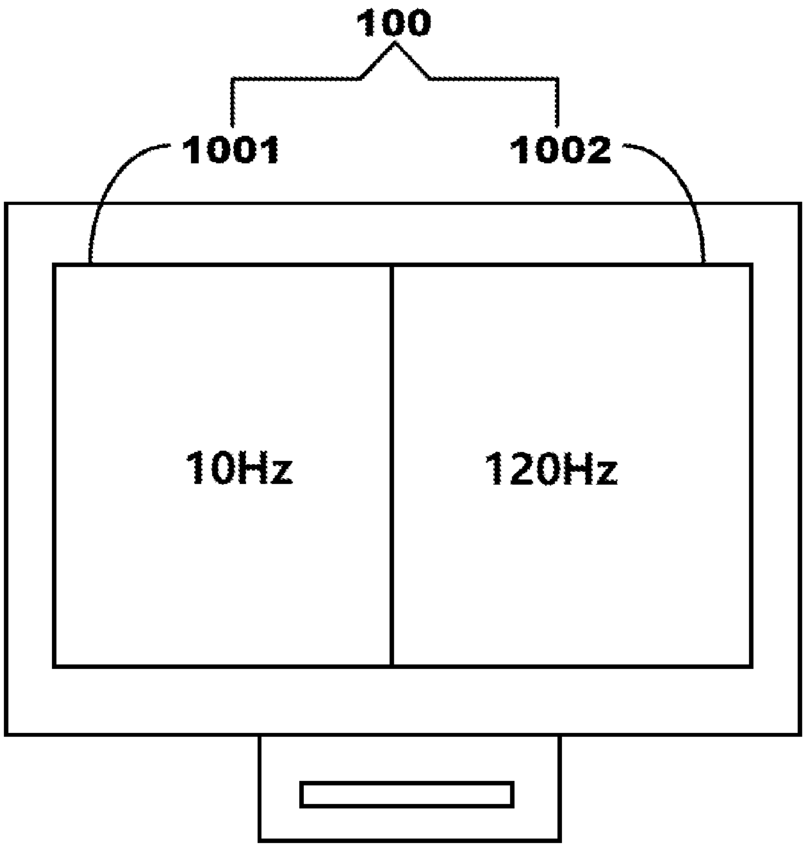
FIG. 2 is a first structural diagram of a display panel according to an embodiment of the present application.
Figure 3:
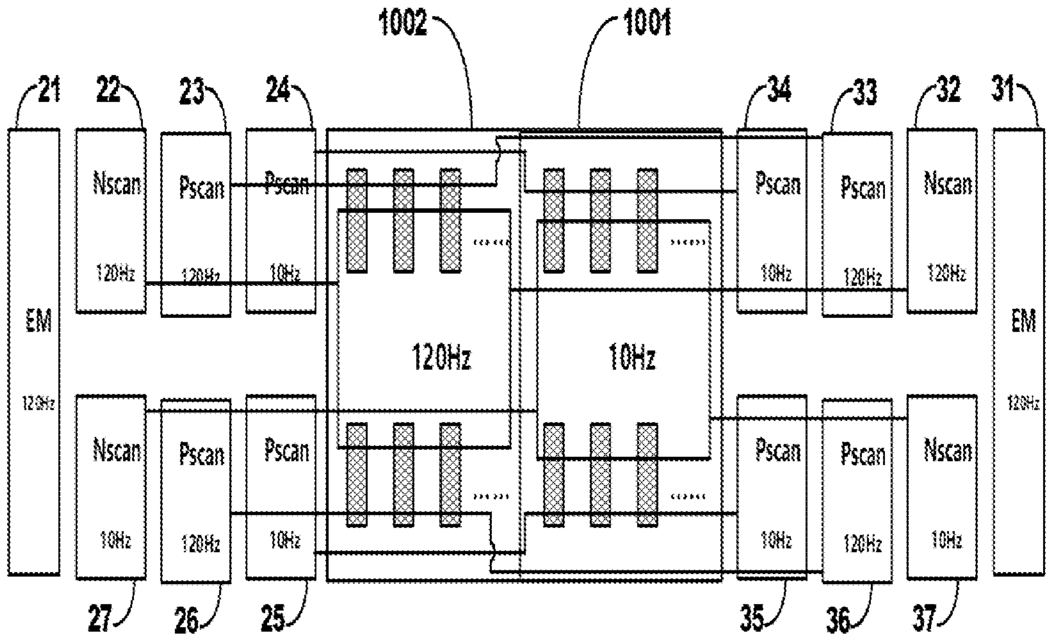
FIG. 3 is a second structural diagram of a display panel according to an embodiment of the present application.
Figure 4:
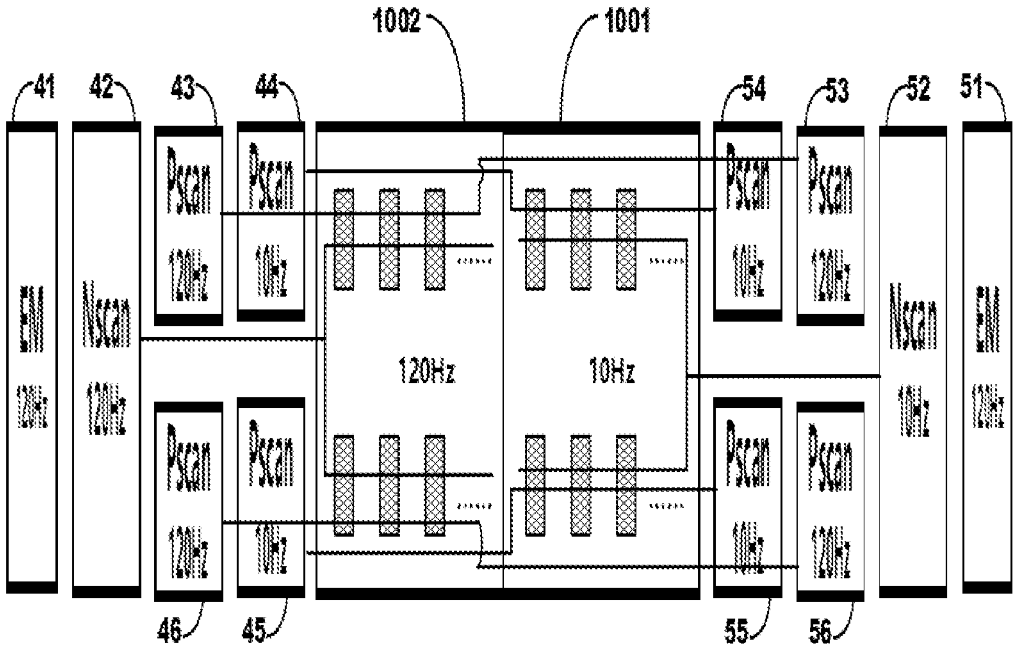
FIG. 4 is a third structural diagram of a display panel according to an embodiment of the present application.

In view of the above-mentioned technical problem of less display functions, an embodiment of the present application provides a display panel, as shown in FIGS. 2 to 11. As shown in FIGS. 2-4, the display panel includes a display area 100 and a non-display area, where the display area 100 includes a first display partition and a second display partition arranged in a first direction. The display panel further includes: a substrate; a plurality of pixel driving circuits disposed on a side of the substrate and located in the display area 100; a gate driving circuit disposed on a side of the substrate and located in the non-display area on both sides of the display area 100 in the first direction; and a plurality of scanning lines disposed on a side of the substrate, where the gate driving circuit is electrically connected to the pixel driving circuits in the same first direction as corresponding one of the scanning lines via the corresponding scanning line; where the gate driving circuit is configured to, in a same frame, transmit a first group of gate driving signals corresponding to a first refresh frequency to ones of the pixel driving circuits in the first display partition and a second group of gate driving signals corresponding to a second refresh frequency to corresponding pixel driving circuits of the pixel driving circuits in the second display partition, and the first refresh frequency is greater than the second refresh frequency.

It should be understood that, according to the display panel provided in the present application, the gate driving circuit is configured to, in the same frame, transmit the first group of gate driving signals corresponding to the first refresh frequency to the pixel driving circuits in the first display partition and the second group of gate driving signals corresponding to the second refresh frequency to the pixel driving circuits in the second display partition, where the first refresh frequency is greater than the second refresh frequency. A plurality of display partitions having different refresh frequencies can be configured in the first direction, so that each of the display partitions in the first direction can be displayed at a required refresh frequency. Furthermore, the overall power consumption of the display panel can also be reduced compared to using the same higher refresh frequency, which enriches the display functions.

Further, since the refresh frequencies of these display partitions are sequentially changed in the first direction when the number of display partitions is larger than two, a brightness difference between adjacent display partitions can be reduced, and the phenomenon of flickering of the display device can be improved or avoided, which further enriches the display functions.

It should be noted that the first direction may be a width direction of the display panel or an arrangement direction of a plurality of data lines.

In an embodiment, the gate driving circuit includes: a light emission driving sub-circuit that is electrically connected to the pixel driving circuits in the same first direction as corresponding one of the scanning lines via the corresponding scanning line and configured to transmit a light emission control signal corresponding to a third refresh frequency to corresponding pixel driving circuits in the display area, where the third refresh frequency is greater than or equal to the first refresh frequency; a first gate driving sub-circuit that is electrically connected to the pixel driving circuits in the same first direction as corresponding one of the scanning lines and located in the first display partition via the corresponding scanning line and configured to transmit a first group of gate driving signals corresponding to the first refresh frequency to the pixel driving circuits in the first display partition; and a second gate driving sub-circuit that is electrically connected to the pixel driving circuits in the same first direction as corresponding one of the scanning lines and located in the second display partition via the corresponding scanning line and configured to transmit a second group of gate driving signals corresponding to the second refresh frequency to the pixel driving circuits in the second display partition.

It should be noted that the first display partition may be a display partition 1002 and the second display partition may be a display partition 1001 in FIGS. 2 to 6.

The first refresh frequency may be the highest refresh frequency of the display panel, for example, 120 Hz, 240 Hz, or the like. An integer multiple of the second refresh frequency may be equal to the first refresh frequency. For example, the second refresh frequency may be 60 Hz, 30 Hz, 10 Hz, or 1 Hz, or the like.

Figure 6:
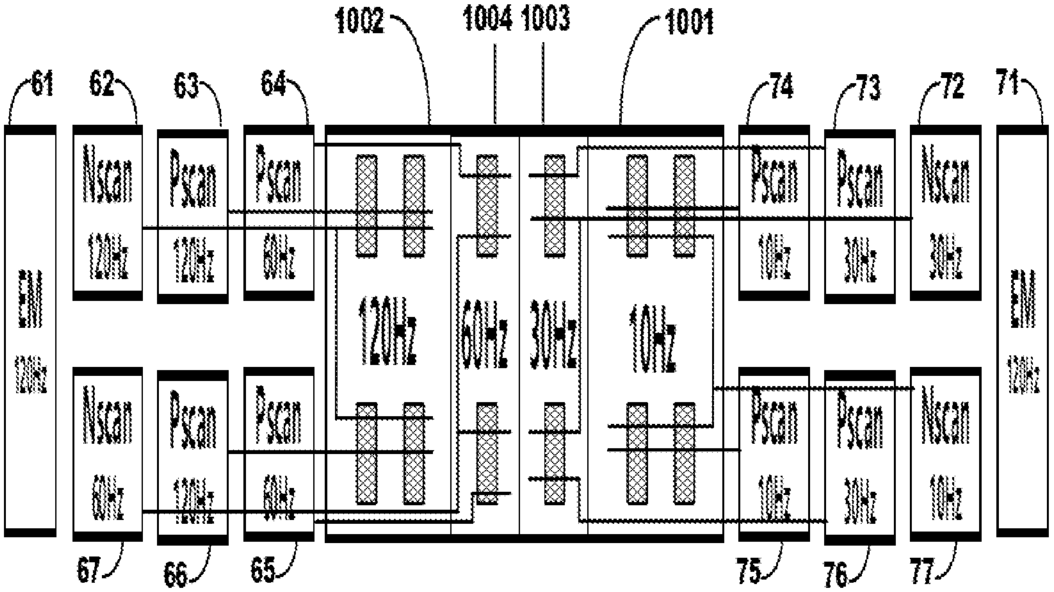
FIG. 6 is a fifth structural diagram of a display panel according to an embodiment of the present application.

In the display area 100 shown in FIGS. 3, 4, and 6, each of the pixel driving circuits may be represented as a rectangular frame having a filling pattern, but the specific shape of the pixel driving circuit is not limited thereto.

The light emission driving sub-circuit may be at least one of a block structure 21 or a block structure 31 shown in FIG. 3; at least one of a block structure 41 or a block structure 51 shown in FIG. 4; or at least one of a block structure 61 or a block structure 71 shown in FIG. 6.

In an embodiment, the first gate driving sub-circuit includes: a first positive gate driving sub-circuit that is electrically connected to the pixel driving circuits in the same first direction as corresponding one of the scanning lines and located in the first display partition via the corresponding scanning line and configured to transmit a first positive gate driving signal corresponding to the first refresh frequency to the pixel driving circuits in the first display partition; and a first negative gate driving sub-circuit that is electrically connected to pixel driving circuits in the same first direction as corresponding one of the scanning lines and located in the first display partition via the corresponding scanning line and configured to transmit a first negative gate driving signal corresponding to the first refresh frequency to the pixel driving circuits in the first display partition.

It should be noted that the first positive gate driving sub-circuit may be at least one of a block structure 22 or a block structure 32 shown in FIG. 3; a block structure 42 shown in FIG. 4; or a block structure 62 shown in FIG. 6.

The first negative gate driving sub-circuit may be at least one of one combination of a block structure 23 with a block structure 26 or another combination of a block structure 33 with a block structure 36 shown in FIG. 3; at least one of one combination of a block structure 43 with a block structure 46 or another combination of a block structure 53 with a block structure 56 shown in FIG. 4; or one combination of a block structure 63 with a block structure 66 shown in FIG. 6.

In an embodiment, the second gate driving sub-circuit includes: a second positive gate driving sub-circuit that is electrically connected to the pixel driving circuits in the same first direction as corresponding one of the scanning lines and located in the second display partition via the corresponding scanning line and configured to transmit a second positive gate driving signal corresponding to the second refresh frequency to ones of the pixel driving circuits in the second display partition; and a second negative gate driving sub-circuit that is electrically connected to the pixel driving circuits in the same first direction as corresponding one of the scanning lines and located in the second display partition via the corresponding scanning line and configured to transmit a second negative gate driving signal corresponding to the second refresh frequency to the pixel driving circuits in the second display partition.

It should be noted that the second positive gate driving sub-circuit may be at least one of a block structure 27 or a block structure 37 shown in FIG. 3; a block structure 52 shown in FIG. 4; or a block structure 67 shown in FIG. 6.

The second negative gate driving sub-circuit may be at least one of one combination of a block structure 24 with a block structure 25 or another combination of a block structure 34 with a block structure 35 shown in FIG. 3; at least one of one combination of a block structure 44 with a block structure 45 or another combination of a block structure 54 with a block structure 55 shown in FIG. 4; or one combination of a block structure 64 with a block structure 65 shown in FIG. 6.

Figure 5:
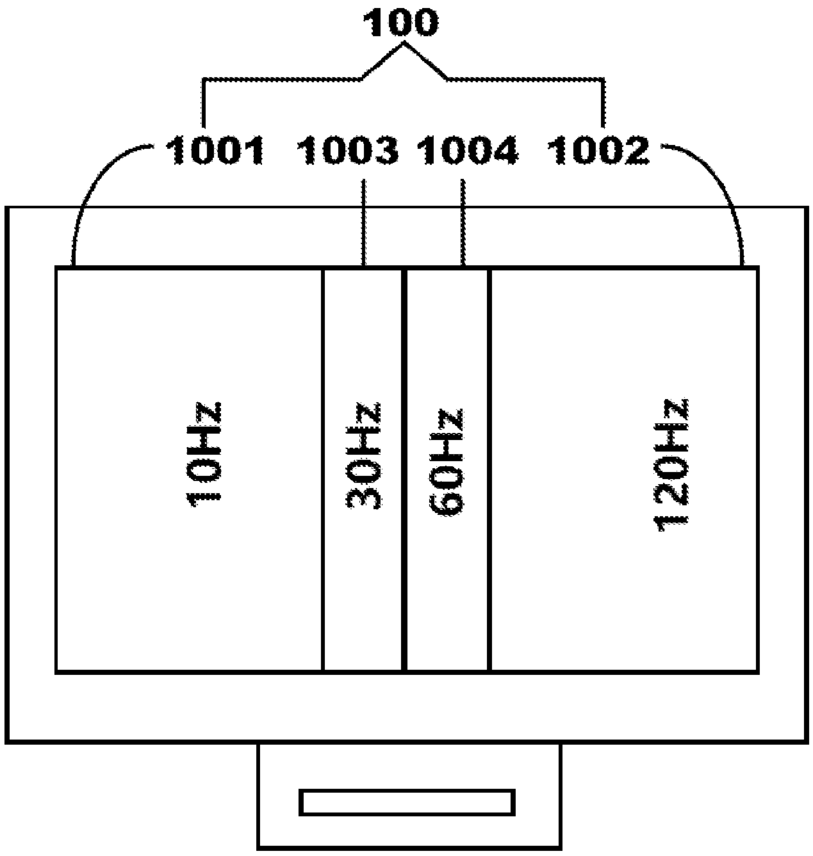
FIG. 5 is a fourth structural diagram of a display panel according to an embodiment of the present application.

In an embodiment, as shown in FIGS. 5-6, the display area further includes a third display partition arranged in the first direction and located on a side of the second display partition away from the first display partition, where the gate driving circuit is further configured to, in the same frame, transmit a third group of gate driving signals corresponding to a fourth refresh frequency to the ones of the pixel driving circuits in the third display partition, and the fourth refresh frequency is less than the second refresh frequency.

It should be noted in the present embodiment that the third display partition may be a display partition 1003 or a display partition 1001.

In an embodiment, the gate driving circuit further includes a third gate driving sub-circuit that is electrically connected to the pixel driving circuits in the same first direction as corresponding one of the scanning lines and located in the third display partition via the corresponding scanning line and configured to transmit the third group of gate driving signals corresponding to the fourth refresh frequency to the pixel driving circuits in the third display partition.

In an embodiment, as shown in FIG. 6, the third gate driving sub-circuit includes: a third positive gate driving sub-circuit that is electrically connected to the pixel driving circuits in the same first direction as corresponding one of the scanning lines and located in the third display partition via the corresponding scanning line and configured to transmit a third positive gate driving signal corresponding to the fourth refresh frequency to the pixel driving circuits in the third display partition; and a third negative gate driving sub-circuit that is electrically connected to the pixel driving circuits in the same first direction as corresponding one of the scanning lines and located in the third display partition via the corresponding scanning line and configured to transmit a third negative gate driving signal corresponding to the fourth refresh frequency to the pixel driving circuits in the third display partition.

It should be noted in the present embodiment that an example in which the third display partition may be the display partition 1003 is taken and the third positive gate driving sub-circuit may be a block structure 72 as shown in FIG. 6.

The third negative gate driving sub-circuit may be one combination of a block structure 73 with a block structure 76 as shown in FIG. 6.

In an embodiment, as shown in FIGS. 5-6, the display area 100 further includes a fourth display partition arranged in the first direction and located on a side of the third display partition away from the first display partition, where the gate driving circuit is further configured to, in the same frame, transmit a fourth group of gate driving signals corresponding to a fifth refresh frequency to the ones of the pixel driving circuits in the fourth display partition, and the fifth refresh frequency is less than the fourth refresh frequency.

It should be noted that the greater the number of display partitions in which the refresh frequencies are sequentially changed are arranged in the first direction, the more advantageously the brightness difference among different display partitions is reduced, thereby further improving the brightness uniformity of the display area 100.

It should be noted in the present embodiment that the third display partition may be the display partition 1003 and the fourth display partition may be the display partition 1001.

In an embodiment, the gate driving circuit further includes a fourth gate driving sub-circuit that is electrically connected to the pixel driving circuits in the same first direction as corresponding one of the scanning lines and located in the fourth display partition via the corresponding scanning line and configured to transmit the fourth group of gate driving signals corresponding to the fifth refresh frequency to the pixel driving circuits in the fourth display partition.

In an embodiment, the fourth gate driving sub-circuit includes: a fourth positive gate driving sub-circuit that is electrically connected to the pixel driving circuits in the same first direction as corresponding one of the scanning lines and located in the fourth display partition via the corresponding scanning line and configured to transmit a fourth positive gate driving signal corresponding to the fifth refresh frequency to the pixel driving circuits in the fourth display partition; and a fourth negative gate driving sub-circuit that is electrically connected to the pixel driving circuits in the same first direction as corresponding one of the scanning lines and located in the fourth display partition via the corresponding scanning line and configured to transmit a fourth negative gate driving signal corresponding to the fifth refresh frequency to the pixel driving circuits in the fourth display partition.

It should be noted in the present embodiment that an example in which the third display partition may be the display partition 1003 and the fourth display partition may be the display partition 1001 is taken, and the fourth positive gate driving sub-circuit may be a block structure 77 as shown in FIG. 6.

The fourth negative gate driving sub-circuit may be one combination of a block structure 74 with a block structure 75 as shown in FIG. 6.

In an embodiment, as shown in FIGS. 3, 4 and 6, two light emission driving sub-circuits are respectively located in the non-display area disposed on both sides of the display area 100 in the first direction and respectively electrically connected to the same corresponding scanning line of the scanning lines, which is further electrically connected to two adjacent rows of pixel driving circuits in the first direction and located in the display area.

At least one of the first positive gate driving sub-circuit, the second positive gate driving sub-circuit, the third positive gate driving sub-circuit, or the fourth positive gate driving sub-circuit is located on at least one side of the display area 100 in the first direction; one or two of the first positive gate driving sub-circuit, the second positive gate driving sub-circuit, the third positive gate driving sub-circuit, and the fourth positive gate driving sub-circuit are electrically connected to the same corresponding scanning line, which is further electrically connected to two adjacent rows of the pixel driving circuits in the first direction and located in a corresponding display partition of the display partitions; at least one of the first negative gate driving sub-circuit, the second negative gate driving sub-circuit, the third negative gate driving sub-circuit, or the fourth negative gate driving sub-circuit is located on at least one side of the display area 100 in the first direction.

One or two of the first negative gate driving sub-circuit, the second negative gate driving sub-circuit, the third negative gate driving sub-circuit, and the fourth negative gate driving sub-circuit are electrically connected to the same corresponding scanning line, which is further electrically connected to a row of pixel driving circuits in the first direction and located in the corresponding display partition.

It should be understood that the present embodiment can be constructed so as to improve the driving capability of the gate driving signals provided to different display partitions.

In an embodiment, a first non-display area in which at least one of the first positive gate driving sub-circuit, the second positive gate driving sub-circuit, the third positive gate driving sub-circuit, or the fourth positive gate driving sub-circuit is located is disposed in the first direction between the display area 100 and an area in which the light emission driving sub-circuit is located; and at least one of the first negative gate driving sub-circuit, the second negative gate driving sub-circuit, the third negative gate driving sub-circuit, or the fourth negative gate driving sub-circuit is disposed in the first direction between the display area 100 and the first non-display area.

It should be understood that the present embodiment can be constructed so as to maximize the driving capability of the gate driving signals provided to different display partitions with minimal frame space.

Figure 7:
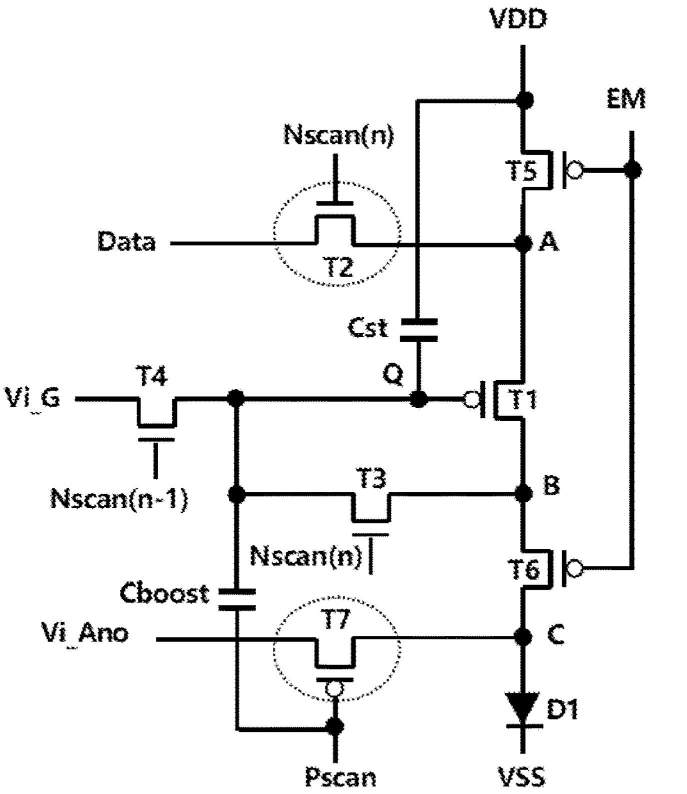
FIG. 7 is a first structural diagram of a pixel driving circuit according to an embodiment of the present application.

In an embodiment, as shown in FIG. 7, each of the pixel driving circuits may include at least: a driving transistor T1, a first light emission control transistor T5, a second light emission control transistor T6, a light emission device D1, a first capacitor Cst, a writing transistor T2, a compensation transistor T3, a first initialization transistor T4, a second initialization transistor T7, and a second capacitor Cboost.

A first electrode of the first light emission control transistor T5 is connected to a first power supply line, a second electrode of the first light emission control transistor T5 is connected to a first electrode of the driving transistor T1, and a gate of the first light emission control transistor T5 is connected to a light emission control line to receive a light emission control signal EM.

A first electrode of the second light emission control transistor T6 is connected to a second electrode of the driving transistor T1, and a gate of the second light emission control transistor T6 is connected to the light emission control line.

An anode of the light emission device D1 is connected to a second electrode of the second light emission control transistor T6, and a cathode of the light emission device D1 is connected to a second power supply line.

A first terminal of the first capacitor Cst is connected to a gate of the driving transistor T1, and a second terminal of the first capacitor Cst is connected to the first power supply line.

A first electrode of the writing transistor T2 is connected to a data line, a second electrode of the writing transistor T2 is connected to the first electrode of the driving transistor T1, a gate of the writing transistor T2 is connected to a first scanning line to receive a corresponding positive gate driving signal according to a refresh frequency of a display partition in which the pixel driving circuit is located, and the writing transistor T2 is an N-channel thin film transistor.

A first electrode of the compensation transistor T3 is connected to the second electrode of the driving transistor T1, a second electrode of the compensation transistor T3 is connected to the gate of the driving transistor T1, and a gate of the compensation transistor T3 is connected to the gate of the writing transistor T2.

A first electrode of the first initialization transistor T4 is connected to a first initialization line, a second electrode of the first initialization transistor T4 is connected to the gate of the driving transistor T1, and a gate of the first initialization transistor T4 is connected to a first control line.

A first electrode of the second initialization transistor T7 is connected to a second initialization line, a second electrode of the second initialization transistor T7 is connected to the anode of the light emission device D1, a gate of the second initialization transistor T7 is connected to a second control line to receive a corresponding negative gate driving signal according to the refresh frequency of the display partition, and the second initialization transistor T7 is a P-channel thin film transistor.

A first terminal of the second capacitor Cboost is connected to the gate of the driving transistor T1, and a second terminal of the second capacitor Cboost is connected to the second control line.

It should be noted in FIG. 7 that a switching frequency of the first light emission control transistor T5 and a switching frequency of the second light emission control transistor T6 remain unchanged at different refresh frequencies, and/or the switching time of each frame of the first light emission control transistor T5 and the second light emission control transistor T6 at different refresh frequencies is greater than or equal to the switching time of each frame of the first light emission control transistor T5 and the second light emission control transistor T6 at the refresh frequency of 60 Hz, which can improve or prevent the brightness difference among the different display partitions from being too large due to the switching frequencies being too low, resulting in a phenomenon of flickering of the different display partitions.

The switching frequency of the second initialization transistor T7 is greater than the switching frequency of the writing transistor T2, which can reduce the number of writing of the writing transistor T2 and the electrical influence of the driving transistor T1, and further improve the occurrence of the flicking phenomenon. Furthermore, this increases the number of switching times of the second initialization transistor T7, which advantageously resets the anode potential of the light emission device D1 a plurality of times to perform brightness adjustment for a plurality of times, thereby further reducing the brightness difference.

As the refresh frequency is decreased, the switching frequency of the second initialization transistor T7 remains unchanged to improve the occurrence of the flicking phenomenon, and the switching frequency of the writing transistor T2, the switching frequency of the compensation transistor T3, and the switching frequency of the first initialization transistor T4 are all decreased accordingly, which can enable each of different display partitions to be displayed at a corresponding refresh frequency.

The first electrode may be one of a source or a drain, and the second electrode may be the other of the source or the drain. For example, when the first electrode is the source, the second electrode is the drain. Alternatively, when the first electrode is the drain, the second electrode is the source.

The light emission device D1 may be an organic light-emitting diode, a micro light-emitting diode, a mini light-emitting diode, or a quantum dot light-emitting diode.

The data line may be configured to transmit a data signal Data. The light emission control line may be configured to transmit the light emission control signal EM. The first power supply line may be configured to transmit a positive power supply signal VDD and the second power supply line may be configured to transmit a negative power supply signal VSS the potential of the positive power supply signal VDD is higher than the potential of the negative power supply signal VSS. The first initialization line may be configured to transmit a first initialization signal Vi_G. The second initialization line may be configured to transmit a second initialization signal Vi_Ano. The first scanning line may be configured to transmit a scanning signal Nscan(n). The first control line may be configured to transmit a scanning signal Nscan(n−1). The second control line may be configured to transmit a scanning signal Pscan.

The gate of the first light emission control transistor T5 and the gate of the second light emission control transistor T6 may share the same light emission control line, and the gate of the writing transistor T2 and the gate of the compensation transistor T3 may share the same first scanning line, both of which can reduce the number of signal lines required by a pixel, thereby facilitating improvement of the opening ratio and the density of the pixel.

Figure 8:
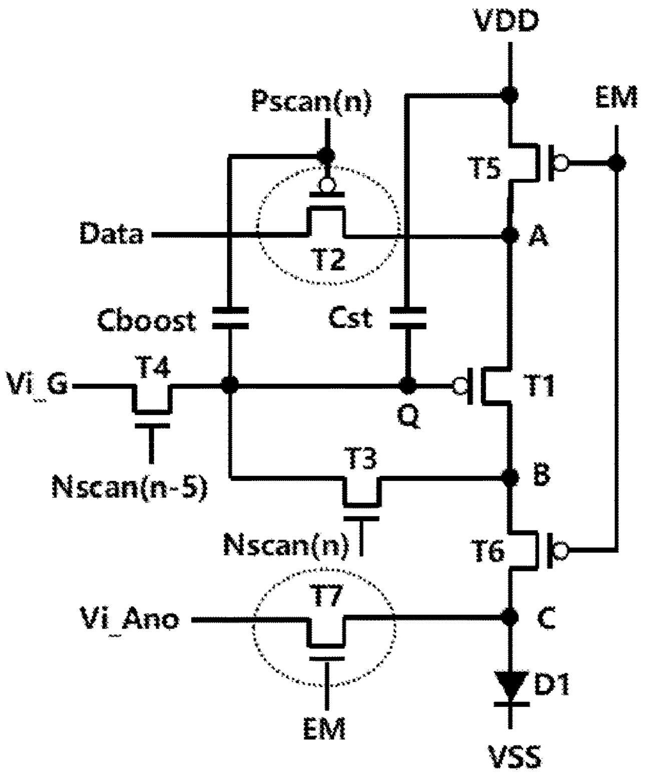
FIG. 8 is a second structural diagram of a pixel driving circuit according to an embodiment of the present application.

In an embodiment, as shown in FIG. 8, each of the pixel driving circuits may include at least: a driving transistor T1, a first light emission control transistor T5, a second light emission control transistor T6, a light emission device D1, a first capacitor Cst, a writing transistor T2, a compensation transistor T3, a first initialization transistor T4, a second initialization transistor T7, and a second capacitor Cboost.

A first electrode of the first light emission control transistor T5 is connected to a first power supply line, a second electrode of the first light emission control transistor T5 is connected to a first electrode of the driving transistor T1, a gate of the first light emission control transistor T5 is connected to a light emission control line to receive a light emission control signal EM, and the first light emission control transistor T5 is a P-channel thin film transistor.

A first electrode of the second light emission control transistor T6 is connected to a second electrode of the driving transistor T1, a gate of the second light emission control transistor T6 is connected to the light emission control line, and the second light emission control transistor T6 is a P-channel thin film transistor.

An anode of the light emission device D1 is connected to a second electrode of the second light emission control transistor T6, and a cathode of the light emission device D1 is connected to a second power supply line.

A first terminal of the first capacitor Cst is connected to a gate of the driving transistor T1, and a second terminal of the first capacitor Cst is connected to the first power supply line.

A first electrode of the writing transistor T2 is connected to a data line, a second electrode of the writing transistor T2 is connected to the first electrode of the driving transistor T1, a gate of the writing transistor T2 is connected to a first scanning line to receive a corresponding negative gate driving signal according to a refresh frequency of a display partition in which the pixel driving circuit is located, and the writing transistor T2 is a P-channel thin film transistor.

A first electrode of the compensation transistor T3 is connected to the second electrode of the driving transistor T1, a second electrode of the compensation transistor T3 is connected to the gate of the driving transistor T1, a gate of the compensation transistor T3 is connected to a second scanning line to receive a corresponding positive gate driving signal according to a refresh frequency of a display partition in which the pixel driving circuit is located, and the compensation transistor T3 is an N-channel thin film transistor.

A first electrode of the first initialization transistor T4 is connected to a first initialization line, a second electrode of the first initialization transistor T4 is connected to the gate of the driving transistor T1, and a gate of the first initialization transistor T4 is connected to a first control line.

A first electrode of the second initialization transistor T7 is connected to a second initialization line, a second electrode of the second initialization transistor T7 is connected to the anode of the light emission device D1, a gate of the second initialization transistor T7 is connected to a light emission control line, and the second initialization transistor T7 is an N-channel thin film transistor.

A first terminal of the second capacitor Cboost is connected to the gate of the driving transistor T1, and a second terminal of the second capacitor Cboost is connected to the first scanning line.

It should be noted in FIG. 8 that a switching frequency of the first light emission control transistor T5 and a switching frequency of the second light emission control transistor T6 remain unchanged at different refresh frequencies, and/or the switching time of each frame of the first light emission control transistor T5 and the second light emission control transistor T6 at different refresh frequencies is greater than or equal to the switching time of each frame of the first light emission control transistor T5 and the second light emission control transistor T6 at the refresh frequency of 60 Hz, which can improve or prevent the brightness difference among the different display partitions from being too large due to the switching frequencies being too low, resulting in a phenomenon of flickering of the different display partitions.

The switching frequency of the second initialization transistor T7 is greater than the switching frequency of the writing transistor T2, which can reduce the number of writing of the writing transistor T2 and the electrical influence of the driving transistor T1, and further improve the occurrence of the flicking phenomenon. Furthermore, this increases the number of switching times of the second initialization transistor T7, which advantageously resets the anode potential of the light emission device D1 a plurality of times to perform brightness adjustment for a plurality of times, thereby further reducing the brightness difference.

As the refresh frequency is decreased, the switching frequency of the second initialization transistor T7 remains unchanged to improve the occurrence of the flicking phenomenon, and the switching frequency of the writing transistor T2, the switching frequency of the compensation transistor T3, and the switching frequency of the first initialization transistor T4 are all decreased accordingly, which can enable each of different display partitions to be displayed at a corresponding refresh frequency.

The data line may be configured to transmit a data signal Data. The light emission control line may be configured to transmit the light emission control signal EM. The first power supply line may be configured to transmit a positive power supply signal VDD and the second power supply line may be configured to transmit a negative power supply signal VSS the potential of the positive power supply signal VDD is higher than the potential of the negative power supply signal VSS. The first initialization line may be configured to transmit a first initialization signal Vi_G. The second initialization line may be configured to transmit a second initialization signal Vi_Ano. The first scanning line may be configured to transmit the scanning signal Pscan(n).

The second scanning line may be configured to transmit the scanning signal Nscan(n). The first control line may be configured to transmit a scanning signal Nscan(n−5).

The gate of the first light emission control transistor T5, the gate of the second light emission control transistor T6, and the gate of the second initialization transistor T7 may share the same light emission control line, which can reduce the number of signal lines required by a pixel, thereby facilitating improvement of the opening ratio and the density of the pixel.

Figure 9:
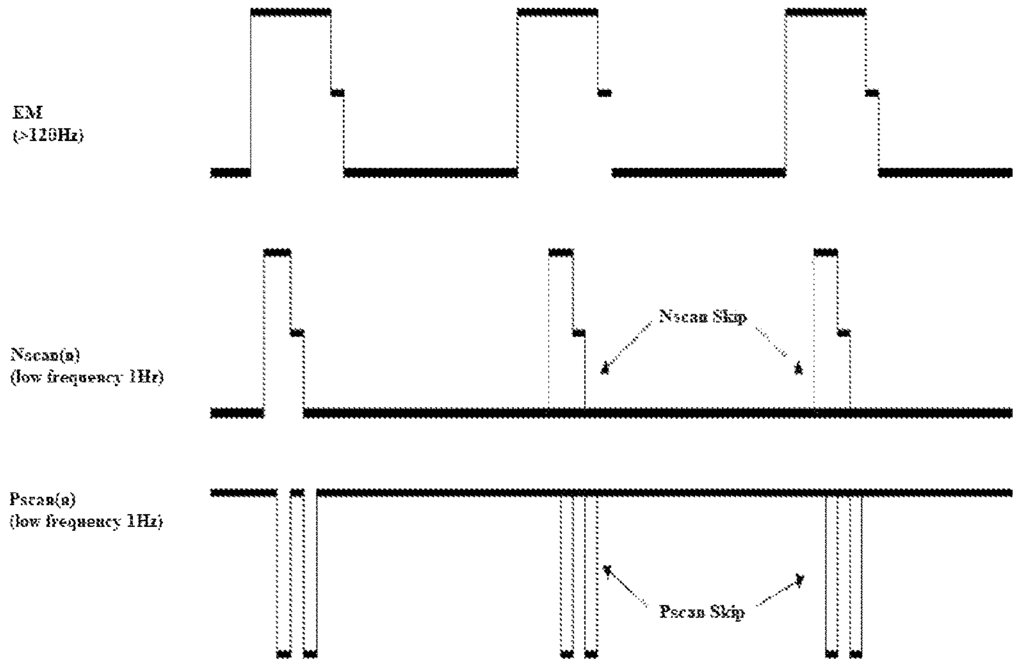
FIG. 9 is a schematic timing diagram of the pixel shown in FIG. 8.

An operation process of the pixel shown in FIG. 8 is as shown in FIG. 9. In a low frequency (a lower refresh frequency than the highest refresh frequency, for example, 1 Hz) display process, the frequency of the light emission control signal EM remains unchanged, and the scanning signal Nscan(n) may be configured to turn on the compensation transistor T3 only in the first time of each frame (corresponding to the first pulse of pulses of the frame from left to right) to write a data signal to the gate of the driving transistor T1, and does not control the compensation transistor T3 to be turned on again in a subsequent period of the frame (two pulses as indicated by Nscan Skip). Similarly, the scanning signal Pscan(n) may be configured to turn on the compensation transistor T3 only in the first time of each frame (corresponding to the first pulse of pulses of the frame from left to right) to write a data signal to the gate of the driving transistor T1, and does not control the writing transistor T2 to be turned on again in the subsequent period of the frame (two pulses as indicated by Pscan Skip). That is, in the low frequency display process, the frequency of the light emission control signal EM may remain unchanged, and the frequency of the scanning signal Nscan(n) and the frequency of the scanning signal Pscan(n) may be decreased with the decreasing of the refresh frequency.

Figure 10:
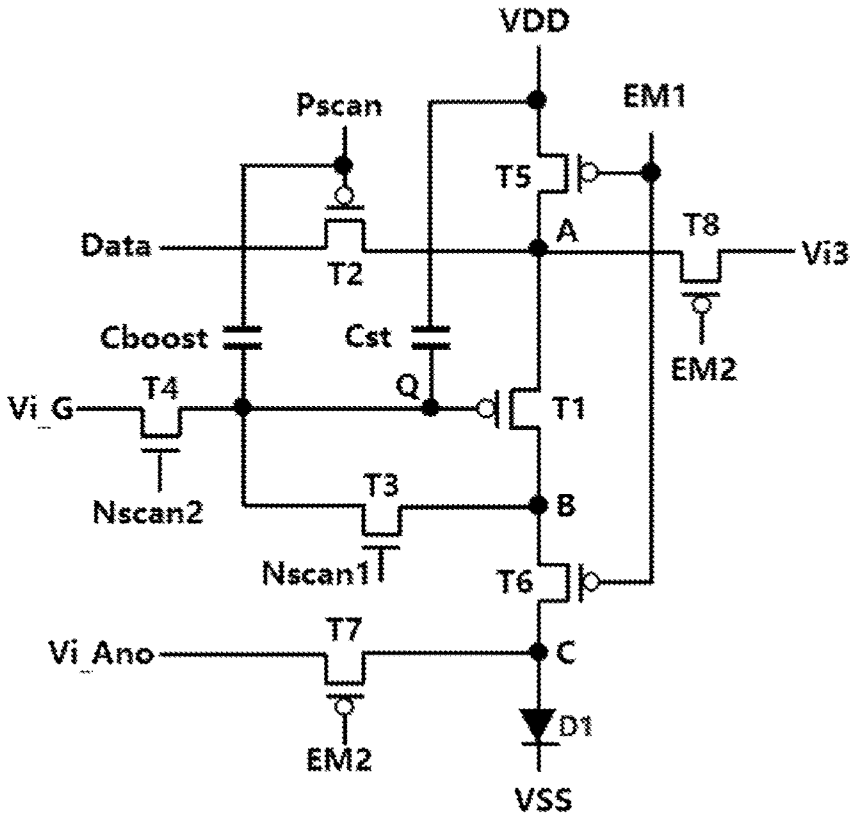
FIG. 10 is a third structural diagram of a pixel driving circuit according to an embodiment of the present application.

In an embodiment, as shown in FIG. 10, each of the pixel driving circuits may include at least: a driving transistor T1, a first light emission control transistor T5, a second light emission control transistor T6, a light emission device D1, a first capacitor Cst, a writing transistor T2, a compensation transistor T3, a first initialization transistor T4, a second initialization transistor T7, a second capacitor Cboost, and a third initialization transistor T8.

A first electrode of the first light emission control transistor T5 is connected to a first power supply line, a second electrode of the first light emission control transistor T5 is connected to a first electrode of the driving transistor T1, and a gate of the first light emission control transistor T5 is connected to a light emission control line to receive a light emission control signal EM1.

A first electrode of the second light emission control transistor T6 is connected to a second electrode of the driving transistor T1, and a gate of the second light emission control transistor T6 is connected to the light emission control line.

An anode of the light emission device D1 is connected to a second electrode of the second light emission control transistor T6, and a cathode of the light emission device D1 is connected to a second power supply line.

A first terminal of the first capacitor Cst is connected to a gate of the driving transistor T1, and a second terminal of the first capacitor Cst is connected to the first power supply line.

A first electrode of the writing transistor T2 is connected to a data line, a second electrode of the writing transistor T2 is connected to the first electrode of the driving transistor T1, a gate of the writing transistor T2 is connected to a first scanning line to receive a corresponding negative gate driving signal according to a refresh frequency of a display partition in which the pixel driving circuit is located, and the writing transistor T2 is a P-channel thin film transistor.

A first electrode of the compensation transistor T3 is connected to the second electrode of the driving transistor T1, a second electrode of the compensation transistor T3 is connected to the gate of the driving transistor T1, a gate of the compensation transistor T3 is connected to a second scanning line to receive a corresponding positive gate driving signal according to a refresh frequency of a display partition in which the pixel driving circuit is located, and the compensation transistor T3 is an N-channel thin film transistor.

A first electrode of the first initialization transistor T4 is connected to a first initialization line, a second electrode of the first initialization transistor T4 is connected to the gate of the driving transistor T1, and a gate of the first initialization transistor T4 is connected to a first control line.

A first electrode of the second initialization transistor T7 is connected to a second initialization line, a second electrode of the second initialization transistor T7 is connected to the anode of the light emission device D1, a gate of the second initialization transistor T7 is connected to a second control line, and the second initialization transistor T7 is a P-channel thin film transistor.

A first terminal of the second capacitor Cboost is connected to the gate of the driving transistor T1, and a second terminal of the second capacitor Cboost is connected to the first scanning line.

A first electrode of the third initialization transistor T8 is connected to a third initialization line, a second electrode of the third initialization transistor T8 is connected to the first electrode of the driving transistor T1, and a gate of the third initialization transistor T8 is connected to the second control line, and the third initialization transistor T8 is a P-channel thin film transistor.

It should be noted in FIG. 8 that a switching frequency of the first light emission control transistor T5 and a switching frequency of the second light emission control transistor T6 remain unchanged at different refresh frequencies, and/or the switching time of each frame of the first light emission control transistor T5 and the second light emission control transistor T6 at different refresh frequencies is greater than or equal to the switching time of each frame of the first light emission control transistor T5 and the second light emission control transistor T6 at the refresh frequency of 60 Hz, which can improve or prevent the brightness difference among the different display partitions from being too large due to the switching frequencies being too low, resulting in a phenomenon of flickering of the different display partitions.

The switching frequency of the second initialization transistor T7 is greater than the switching frequency of the writing transistor T2, which can reduce the number of writing of the writing transistor T2 and the electrical influence of the driving transistor T1, and further improve the occurrence of the flicking phenomenon. Furthermore, this increases the number of switching times of the second initialization transistor T7, which advantageously resets the anode potential of the light emission device D1 a plurality of times to perform brightness adjustment for a plurality of times, thereby further reducing the brightness difference.

As the refresh frequency is decreased, the switching frequency of the second initialization transistor T7 and the switching frequency of the third initialization transistor T8 both remain unchanged to improve the occurrence of the flicking phenomenon, and the switching frequency of the writing transistor T2, the switching frequency of the compensation transistor T3, and the switching frequency of the first initialization transistor T4 are all decreased accordingly, which can enable each of different display partitions to be displayed at a corresponding refresh frequency.

The data line may be configured to transmit a data signal Data. The light emission control line may be configured to transmit the light emission control signal EM1. The first power supply line may be configured to transmit a positive power supply signal VDD and the second power supply line may be configured to transmit a negative power supply signal VSS the potential of the positive power supply signal VDD is higher than the potential of the negative power supply signal VSS. The first initialization line may be configured to transmit a first initialization signal Vi_G. The second initialization line may be configured to transmit a second initialization signal Vi_Ano. The third initialization line may be configured to transmit a third initialization signal Vi3. The first scanning line may be configured to transmit the scanning signal Pscan. The second scanning line may be configured to transmit the scanning signal Nscan1. The first control line may be configured to transmit the scanning signal Nscan2. The second control line may be configured to transmit a second control signal EM2.

The gate of the first light emission control transistor T5 and the gate of the second light emission control transistor T6 may share the same light emission control line, and the gate of the second initialization transistor T7 and the gate of the third initialization transistor T8 may share the same second control line, both of which can reduce the number of signal lines required by a pixel, thereby facilitating improvement of the opening ratio and the density of the pixel.

Figure 11:
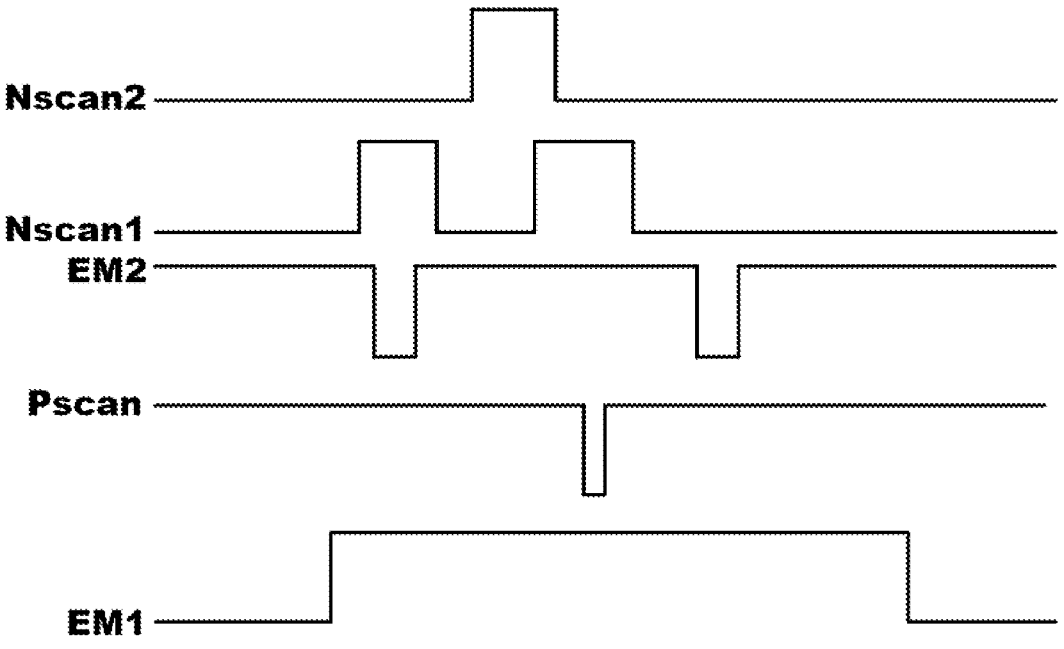
FIG. 11 is a schematic timing diagram of the pixel shown in FIG. 10.

An operation process of the pixel shown in FIG. 10 is shown in FIG. 11, which includes the following stages.

In a first stage, the scanning signal Nscan1 is at a high potential, and thus the compensation transistor T3 is turned on; and the second control signal EM2 is at a low potential, and thus both the second initialization transistor T7 and the third initialization transistor T8 are turned on to reset the potential of the anode of the light emitting device D1 and the potential of a point of A.

In a second stage, the scanning signal Nscan2 is at a high potential, and thus the first initialization transistor T4 is turned on to reset the potential of the gate of the driving transistor T1.

In a third stage, the scanning signal Nscan1 is at a high potential, and thus the compensation transistor T3 is turned on; and the scanning signal Pscan is at a low potential, and thus the writing transistor T2 is turned on to write a data signal to the gate of the driving transistor T1.

In a fourth stage, the second control signal EM2 is at a low potential, and both the second initialization transistor T7 and the third initialization transistor T8 are turned on to reset the potential of the anode of the light emitting device D1 and the potential of the point of A again.

In a fifth stage, the light emission control signal EM1 is at a low potential, and thus the first light emission control transistor T5 and the second light emission control transistor T6 are both turned on to enable a light emission current to flow through the light emission device D1 so that the light emission device D1 can emit light.

Another embodiment of the present application provides a display device including the display panel according to any one of the foregoing embodiments.

It should be understood that, since the display device provided in the embodiment of the present application includes the display panel according to any one of the foregoing embodiments, the gate driving circuit can be configured to, in the same frame, transmit the first group of gate driving signals corresponding to the first refresh frequency to the pixel driving circuits in the first display partition and the second group of gate driving signals corresponding to the second refresh frequency to the pixel driving circuits in the second display partition, where the first refresh frequency is greater than the second refresh frequency. A plurality of display partitions having different refresh frequencies can be configured in the first direction, so that each of the display partitions in the first direction can be displayed at a required refresh frequency. Furthermore, the overall power consumption of the display panel can also be reduced compared to using the same higher refresh frequency, which enriches the display functions.

Further, since the refresh frequencies of these display partitions are sequentially changed in the first direction when the number of display partitions is larger than two, a brightness difference between adjacent display partitions can be reduced, and the phenomenon of flickering of the display device can be improved or avoided, which further enriches the display functions.

It can be understood that, for those ordinary skilled in the art, equivalent replacements or changes can be made according to the technical solutions and inventive concepts of the present application, and all such changes or replacements should fall within the protection scope of the claims appended to the present application.

What is claimed is:

1. A display panel, comprising a display area and a non-display area, the display area including a first display partition and a second display partition arranged in a first direction, wherein, the display panel further comprises:

a substrate;

a plurality of pixel driving circuits disposed on a side of the substrate and located in the display area;

a gate driving circuit disposed on a side of the substrate and located in the non-display area on both sides of the display area in the first direction; and a plurality of scanning lines disposed on a side of the substrate, wherein the gate driving circuit is electrically connected to the pixel driving circuits in the same first direction as corresponding one of the scanning lines via the corresponding scanning line;

wherein the gate driving circuit is configured to, in a same frame, transmit a first group of gate driving signals corresponding to a first refresh frequency to ones of the pixel driving circuits in the first display partition and transmit a second group of gate driving signals corresponding to a second refresh frequency to ones of the pixel driving circuits in the second display partition, the first refresh frequency being greater than the second refresh frequency;

wherein the gate driving circuit comprises:

a light emission driving sub-circuit electrically connected to the pixel driving circuits in the same first direction as corresponding one of the scanning lines via the corresponding scanning line and configured to transmit a light emission control signal corresponding to a third refresh frequency to the corresponding pixel driving circuits in the display area, the third refresh frequency being greater than or equal to the first refresh frequency;

a first gate driving sub-circuit electrically connected to the pixel driving circuits in the same first direction as corresponding one of the scanning lines and located in the first display partition via the corresponding scanning line and configured to transmit the first group of gate driving signals to the ones of the pixel driving circuits in the first display partition; and a second gate driving sub-circuit electrically connected to the pixel driving circuits in the same first direction as corresponding one of the scanning lines and located in the second display partition via the corresponding scanning line and configured to transmit the second group of gate driving signals to the ones of the pixel driving circuits in the second display partition;

wherein the first gate driving sub-circuit comprises:

a first positive gate driving sub-circuit electrically connected to the pixel driving circuits in the same first direction as corresponding one of the scanning lines and located in the first display partition via the corresponding scanning line and configured to transmit a first positive gate driving signal corresponding to the first refresh frequency to the ones of the pixel driving circuits in the first display partition; and a first negative gate driving sub-circuit electrically connected to pixel driving circuits in the same first direction as corresponding one of the scanning lines and located in the first display partition via the corresponding scanning line and configured to transmit a first negative gate driving signal corresponding to the first refresh frequency to the ones of the pixel driving circuits in the first display partition;

wherein the second gate driving sub-circuit comprises:

a second positive gate driving sub-circuit electrically connected to the pixel driving circuits in the same first direction as corresponding one of the scanning lines and located in the second display partition via the corresponding scanning line and configured to transmit a second positive gate driving signal corresponding to the second refresh frequency to the ones of the pixel driving circuits in the second display partition; and a second negative gate driving sub-circuit electrically connected to the pixel driving circuits in the same first direction as corresponding one of the scanning lines and located in the second display partition via the corresponding scanning line and configured to transmit a second negative gate driving signal corresponding to the second refresh frequency to the ones of the pixel driving circuits in the second display partition;

wherein the display area further comprises a third display partition arranged on a side of the second display partition away from the first display partition in the first direction; and wherein the gate driving circuit is further configured to, in the same frame, transmit a third group of gate driving signals corresponding to a fourth refresh frequency to ones of the pixel driving circuits in the third display partition, the fourth refresh frequency being less than the second refresh frequency.

2. The display panel of claim 1, wherein the gate driving circuit further comprises a third gate driving sub-circuit that is electrically connected to the pixel driving circuits in the same first direction as corresponding one of the scanning lines and located in the third display partition via the corresponding scanning line and configured to transmit the third group of gate driving signals to the ones of the pixel driving circuits in the third display partition.

3. The display panel of claim 2, wherein the third gate driving sub-circuit comprises:

a third positive gate driving sub-circuit electrically connected to the pixel driving circuits in the same first direction as corresponding one of the scanning lines and located in the third display partition via the corresponding scanning line and configured to transmit a third positive gate driving signal corresponding to the fourth refresh frequency to the pixel driving circuits in the third display partition; and a third negative gate driving sub-circuit electrically connected to the pixel driving circuits in the same first direction as corresponding one of the scanning lines and located in the third display partition via the corresponding scanning line and configured to transmit a third negative gate driving signal corresponding to the fourth refresh frequency to the pixel driving circuits in the third display partition.

4. The display panel of claim 3, wherein the display area further comprises a fourth display partition arranged on a side of the third display partition away from the first display partition in the first direction; and wherein the gate driving circuit is further configured to, in the same frame, transmit a fourth group of gate driving signals corresponding to a fifth refresh frequency to ones of the pixel driving circuits in the fourth display partition, the fifth refresh frequency being less than the fourth refresh frequency.

5. The display panel of claim 4, wherein the gate driving circuit further comprises a fourth gate driving sub-circuit that is electrically connected to the pixel driving circuits in the same first direction as corresponding one of the scanning lines and located in the fourth display partition via the corresponding scanning line and configured to transmit the fourth group of gate driving signals to the ones of the pixel driving circuits in the fourth display partition.

6. The display panel of claim 5, wherein the fourth gate driving sub-circuit comprises:

a fourth positive gate driving sub-circuit electrically connected to the pixel driving circuits in the same first direction as corresponding one of the scanning lines and located in the fourth display partition via the corresponding scanning line and configured to transmit a fourth positive gate driving signal corresponding to the fifth refresh frequency to the ones of the pixel driving circuits in the fourth display partition; and a fourth negative gate driving sub-circuit electrically connected to the pixel driving circuits in the same first direction as corresponding one of the scanning lines and located in the fourth display partition via the corresponding scanning line and configured to transmit a fourth negative gate driving signal corresponding to the fifth refresh frequency to the ones of the pixel driving circuits in the fourth display partition.

7. The display panel of claim 5, wherein two light emission driving sub-circuits are respectively located in the non-display area disposed on both sides of the display area in the first direction and respectively electrically connected to the same corresponding scanning line of the scanning lines, which is further electrically connected to two adjacent rows of pixel driving circuits in the first direction and located in the display area;

at least one of the first positive gate driving sub-circuit, the second positive gate driving sub-circuit, the third positive gate driving sub-circuit, or the fourth positive gate driving sub-circuit is located on at least one side of the display area in the first direction; one or two of the first positive gate driving sub-circuit, the second positive gate driving sub-circuit, the third positive gate driving sub-circuit, and the fourth positive gate driving sub-circuit are electrically connected to the same corresponding scanning line, which is further electrically connected to two adjacent rows of the pixel driving circuits in the first direction and located in a corresponding display partition of the display partitions; and at least one of the first negative gate driving sub-circuit, the second negative gate driving sub-circuit, the third negative gate driving sub-circuit, or the fourth negative gate driving sub-circuit is located on at least one side of the display area in the first direction; and one or two of the first negative gate driving sub-circuit, the second negative gate driving sub-circuit, the third negative gate driving sub-circuit, and the fourth negative gate driving sub-circuit are electrically connected to the same corresponding scanning line, which is further electrically connected to a row of pixel driving circuits in the first direction and located in the corresponding display partition.

8. The display panel of claim 7, wherein a first non-display area in which at least one of the first positive gate driving sub-circuit, the second positive gate driving sub-circuit, the third positive gate driving sub-circuit, or the fourth positive gate driving sub-circuit is located is disposed in the first direction between the display area and an area in which the light emission driving sub-circuit is located; and at least one of the first negative gate driving sub-circuit, the second negative gate driving sub-circuit, the third negative gate driving sub-circuit, or the fourth negative gate driving sub-circuit is disposed in the first direction between the display area and the first non-display area.

9. The display panel of claim 1, wherein the pixel driving circuit comprises:

a driving transistor;

a first light emission control transistor, wherein a first electrode of the first light emission control transistor is connected to a first power supply line, a second electrode of the first light emission control transistor is connected to a first electrode of the driving transistor, and a gate of the first light emission control transistor is connected to a light emission control line to receive a light emission control signal;

a second light emission control transistor, wherein a first electrode of the second light emission control transistor is connected to a second electrode of the driving transistor, and a gate of the second light emission control transistor is connected to the light emission control line;

a light emission device, wherein an anode of the light emission device is connected to a second electrode of the second light emission control transistor, and a cathode of the light emission device is connected to a second power supply line;

a first capacitor, wherein a first terminal of the first capacitor is connected to a gate of the driving transistor, and a second terminal of the first capacitor is connected to the first power supply line;

a writing transistor, wherein a first electrode of the writing transistor is connected to a data line, a second electrode of the writing transistor is connected to the first electrode of the driving transistor, a gate of the writing transistor is connected to a first scanning line to receive a corresponding positive gate driving signal according to a refresh frequency of a display partition in which the pixel driving circuit is located, and the writing transistor is an N-channel thin film transistor;

a compensation transistor, wherein a first electrode of the compensation transistor is connected to the second electrode of the driving transistor, a second electrode of the compensation transistor is connected to the gate of the driving transistor, and a gate of the compensation transistor is connected to the gate of the writing transistor;

a first initialization transistor, wherein a first electrode of the first initialization transistor is connected to a first initialization line, a second electrode of the first initialization transistor is connected to the gate of the driving transistor, and a gate of the first initialization transistor is connected to a first control line;

a second initialization transistor, wherein a first electrode of the second initialization transistor is connected to a second initialization line, a second electrode of the second initialization transistor is connected to the anode of the light emission device, a gate of the second initialization transistor is connected to a second control line to receive a corresponding negative gate driving signal according to the refresh frequency of the display partition, and the second initialization transistor is a P-channel thin film transistor; and a second capacitor, where a first terminal of the second capacitor is connected to the gate of the driving transistor, and a second terminal of the second capacitor is connected to the second control line;

wherein a switching frequency of the first light emission control transistor and a switching frequency of the second light emission control transistor remain unchanged at different refresh frequencies, and/or the switching time of each frame of the first light emission control transistor and the second light emission control transistor at different refresh frequencies is greater than or equal to the switching time of each frame of the first light emission control transistor and the second light emission control transistor at the refresh frequency of 60 Hz; the switching frequency of the second initialization transistor is greater than the switching frequency of the writing transistor; as the refresh frequency is decreased, the switching frequency of the second initialization transistor remains unchanged, and the switching frequency of the writing transistor, the switching frequency of the compensation transistor, and the switching frequency of the first initialization transistor are all decreased.

10. The display panel of claim 1, wherein the pixel driving circuit comprises:

a driving transistor;

a first light emission control transistor, wherein a first electrode of the first light emission control transistor is connected to a first power supply line, a second electrode of the first light emission control transistor is connected to a first electrode of the driving transistor, a gate of the first light emission control transistor is connected to a light emission control line to receive a light emission control signal, and the first light emission control transistor is a P-channel thin film transistor;

a second light emission control transistor, wherein a first electrode of the second light emission control transistor is connected to a second electrode of the driving transistor, a gate of the second light emission control transistor is connected to the light emission control line, and the second light emission control transistor is a P-channel thin film transistor;

a light emission device, wherein an anode of the light emission device is connected to a second electrode of the second light emission control transistor, and a cathode of the light emission device is connected to a second power supply line;

a first capacitor, wherein a first terminal of the first capacitor is connected to a gate of the driving transistor, and a second terminal of the first capacitor is connected to the first power supply line;

a writing transistor, wherein a first electrode of the writing transistor is connected to a data line, a second electrode of the writing transistor is connected to the first electrode of the driving transistor, a gate of the writing transistor is connected to a first scanning line to receive a corresponding negative gate driving signal according to a refresh frequency of a display partition in which the pixel driving circuit is located, and the writing transistor is a P-channel thin film transistor a compensation transistor, where a first electrode of the compensation transistor is connected to the second electrode of the driving transistor, a second electrode of the compensation transistor is connected to the gate of the driving transistor, a gate of the compensation transistor is connected to a second scanning line to receive a corresponding positive gate driving signal according to the refresh frequency of the display partition, and the compensation transistor is an N-channel thin film transistor;

a first initialization transistor, wherein a first electrode of the first initialization transistor is connected to a first initialization line, a second electrode of the first initialization transistor is connected to the gate of the driving transistor, and a gate of the first initialization transistor is connected to a first control line;

a second initialization transistor, wherein a first electrode of the second initialization transistor is connected to a second initialization line, a second electrode of the second initialization transistor is connected to the anode of the light emission device, a gate of the second initialization transistor is connected to the light emission control line, and the second initialization transistor is an N-channel thin film transistor; and a second capacitor, wherein a first terminal of the second capacitor is connected to the gate of the driving transistor, and a second terminal of the second capacitor is connected to the first scanning line wherein a switching frequency of the first light emission control transistor and a switching frequency of the second light emission control transistor remain unchanged at different refresh frequencies, and/or the switching time of each frame of the first light emission control transistor and the second light emission control transistor at different refresh frequencies is greater than or equal to the switching time of each frame of the first light emission control transistor and the second light emission control transistor at the refresh frequency of 60 Hz; the switching frequency of the second initialization transistor is greater than the switching frequency of the writing transistor; as the refresh frequency is decreased, the switching frequency of the second initialization transistor remains unchanged, and the switching frequency of the writing transistor, the switching frequency of the compensation transistor, and the switching frequency of the first initialization transistor are all decreased.

11. The display panel of claim 1, wherein the pixel driving circuit comprises:

a driving transistor;

a first light emission control transistor, wherein a first electrode of the first light emission control transistor is connected to a first power supply line, a second electrode of the first light emission control transistor is connected to a first electrode of the driving transistor, and a gate of the first light emission control transistor is connected to a light emission control line to receive a light emission control signal;

a second light emission control transistor, wherein a first electrode of the second light emission control transistor is connected to a second electrode of the driving transistor, and a gate of the second light emission control transistor is connected to the light emission control line;

a light emission device, wherein an anode of the light emission device is connected to a second electrode of the second light emission control transistor, and a cathode of the light emission device is connected to a second power supply line;

a first capacitor, wherein a first terminal of the first capacitor is connected to a gate of the driving transistor, and a second terminal of the first capacitor is connected to the first power supply line;

a writing transistor, wherein a first electrode of the writing transistor is connected to a data line, a second electrode of the writing transistor is connected to the first electrode of the driving transistor, a gate of the writing transistor is connected to a first scanning line to receive a corresponding negative gate driving signal according to a refresh frequency of a display partition in which the pixel driving circuit is located, and the writing transistor is a P-channel thin film transistor a compensation transistor, where a first electrode of the compensation transistor is connected to the second electrode of the driving transistor, a second electrode of the compensation transistor is connected to the gate of the driving transistor, a gate of the compensation transistor is connected to a second scanning line to receive a corresponding positive gate driving signal according to the refresh frequency of the display partition, and the compensation transistor is an N-channel thin film transistor;

a first initialization transistor, wherein a first electrode of the first initialization transistor is connected to a first initialization line, a second electrode of the first initialization transistor is connected to the gate of the driving transistor, and a gate of the first initialization transistor is connected to a first control line;

a second initialization transistor, wherein a first electrode of the second initialization transistor is connected to a second initialization line, a second electrode of the second initialization transistor is connected to the anode of the light emission device, a gate of the second initialization transistor is connected to a second control line, and the second initialization transistor is a P-channel thin film transistor;

a second capacitor, wherein a first terminal of the second capacitor is connected to the gate of the driving transistor, and a second terminal of the second capacitor is connected to the first scanning line; and a third initialization transistor, wherein a first electrode of the third initialization transistor is connected to a third initialization line, a second electrode of the third initialization transistor is connected to the first electrode of the driving transistor, a gate of the third initialization transistor is connected to the second control line, and the third initialization transistor is a P-channel thin film transistor;

wherein a switching frequency of the first light emission control transistor and a switching frequency of the second light emission control transistor remain unchanged at different refresh frequencies, and/or the switching time of each frame of the first light emission control transistor and the second light emission control transistor at different refresh frequencies is greater than or equal to the switching time of each frame of the first light emission control transistor and the second light emission control transistor at the refresh frequency of 60 Hz; the switching frequency of the second initialization transistor is greater than the switching frequency of the writing transistor; as the refresh frequency is decreased, the switching frequencies of the second initialization transistor and the third initialization transistor remain unchanged, and the switching frequency of the writing transistor, the switching frequency of the compensation transistor, and the switching frequency of the first initialization transistor are all decreased.

12. A display device, comprising a display panel, wherein the display panel comprises a display area and a non-display area, the display area including a first display partition and a second display partition arranged in a first direction wherein, the display panel further comprises:

a substrate;

a plurality of pixel driving circuits disposed on a side of the substrate and located in the display area;

a gate driving circuit disposed on a side of the substrate and located in the non-display area on both sides of the display area in the first direction; and a plurality of scanning lines disposed on a side of the substrate, wherein the gate driving circuit is electrically connected to the pixel driving circuits in the same first direction as corresponding one of the scanning lines via the corresponding scanning line;

wherein the gate driving circuit is configured to, in a same frame, transmit a first group of gate driving signals corresponding to a first refresh frequency to ones of the pixel driving circuits in the first display partition and transmit a second group of gate driving signals corresponding to a second refresh frequency to ones of the pixel driving circuits in the second display partition, the first refresh frequency being greater than the second refresh frequency;

wherein the gate driving circuit comprises:

a light emission driving sub-circuit electrically connected to the pixel driving circuits in the same first direction as corresponding one of the scanning lines via the corresponding scanning line and configured to transmit a light emission control signal corresponding to a third refresh frequency to the corresponding pixel driving circuits in the display area, the third refresh frequency being greater than or equal to the first refresh frequency;

a first gate driving sub-circuit electrically connected to the pixel driving circuits in the same first direction as corresponding one of the scanning lines and located in the first display partition via the corresponding scanning line and configured to transmit the first group of gate driving signals to the ones of the pixel driving circuits in the first display partition; and a second gate driving sub-circuit electrically connected to the pixel driving circuits in the same first direction as corresponding one of the scanning lines and located in the second display partition via the corresponding scanning line and configured to transmit the second group of gate driving signals to the ones of the pixel driving circuits in the second display partition;

wherein the first gate driving sub-circuit comprises:

a first positive gate driving sub-circuit electrically connected to the pixel driving circuits in the same first direction as corresponding one of the scanning lines and located in the first display partition via the corresponding scanning line and configured to transmit a first positive gate driving signal corresponding to the first refresh frequency to the ones of the pixel driving circuits in the first display partition; and a first negative gate driving sub-circuit electrically connected to pixel driving circuits in the same first direction as corresponding one of the scanning lines and located in the first display partition via the corresponding scanning line and configured to transmit a first negative gate driving signal corresponding to the first refresh frequency to the ones of the pixel driving circuits in the first display partition;

wherein the second gate driving sub-circuit comprises:

a second positive gate driving sub-circuit electrically connected to the pixel driving circuits in the same first direction as corresponding one of the scanning lines and located in the second display partition via the corresponding scanning line and configured to transmit a second positive gate driving signal corresponding to the second refresh frequency to the ones of the pixel driving circuits in the second display partition; and a second negative gate driving sub-circuit electrically connected to the pixel driving circuits in the same first direction as corresponding one of the scanning lines and located in the second display partition via the corresponding scanning line and configured to transmit a second negative gate driving signal corresponding to the second refresh frequency to the ones of the pixel driving circuits in the second display partition;

wherein the display area further comprises a third display partition arranged on a side of the second display partition away from the first display partition in the first direction; and wherein the gate driving circuit is further configured to, in the same frame, transmit a third group of gate driving signals corresponding to a fourth refresh frequency to ones of the pixel driving circuits in the third display partition, the fourth refresh frequency being less than the second refresh frequency.

13. The display device of claim 12, wherein the gate driving circuit further comprises a third gate driving sub-circuit that is electrically connected to the pixel driving circuits in the same first direction as corresponding one of the scanning lines and located in the third display partition via the corresponding scanning line and configured to transmit the third group of gate driving signals to the ones of the pixel driving circuits in the third display partition.

14. The display device of claim 13, wherein the third gate driving sub-circuit comprises:

a third positive gate driving sub-circuit electrically connected to the pixel driving circuits in the same first direction as corresponding one of the scanning lines and located in the third display partition via the corresponding scanning line and configured to transmit a third positive gate driving signal corresponding to the fourth refresh frequency to the pixel driving circuits in the third display partition; and a third negative gate driving sub-circuit electrically connected to the pixel driving circuits in the same first direction as corresponding one of the scanning lines and located in the third display partition via the corresponding scanning line and configured to transmit a third negative gate driving signal corresponding to the fourth refresh frequency to the pixel driving circuits in the third display partition.

15. The display device of claim 14, wherein the display area further comprises a fourth display partition arranged on a side of the third display partition away from the first display partition in the first direction; and wherein the gate driving circuit is further configured to, in the same frame, transmit a fourth group of gate driving signals corresponding to a fifth refresh frequency to ones of the pixel driving circuits in the fourth display partition, the fifth refresh frequency being less than the fourth refresh frequency.

16. The display device of claim 15, wherein the gate driving circuit further comprises a fourth gate driving sub-circuit that is electrically connected to the pixel driving circuits in the same first direction as corresponding one of the scanning lines and located in the fourth display partition via the corresponding scanning line and configured to transmit the fourth group of gate driving signals to the ones of the pixel driving circuits in the fourth display partition.

17. The display device of claim 16, wherein the fourth gate driving sub-circuit comprises:

a fourth positive gate driving sub-circuit electrically connected to the pixel driving circuits in the same first direction as corresponding one of the scanning lines and located in the fourth display partition via the corresponding scanning line and configured to transmit a fourth positive gate driving signal corresponding to the fifth refresh frequency to the ones of the pixel driving circuits in the fourth display partition; and a fourth negative gate driving sub-circuit electrically connected to the pixel driving circuits in the same first direction as corresponding one of the scanning lines and located in the fourth display partition via the corresponding scanning line and configured to transmit a fourth negative gate driving signal corresponding to the fifth refresh frequency to the ones of the pixel driving circuits in the fourth display partition.

18. The display device of claim 17, wherein two light emission driving sub-circuits are respectively located in the non-display area disposed on both sides of the display area in the first direction and respectively electrically connected to the same corresponding scanning line of the scanning lines, which is further electrically connected to two adjacent rows of pixel driving circuits in the first direction and located in the display area;

at least one of the first positive gate driving sub-circuit, the second positive gate driving sub-circuit, the third positive gate driving sub-circuit, or the fourth positive gate driving sub-circuit is located on at least one side of the display area in the first direction; one or two of the first positive gate driving sub-circuit, the second positive gate driving sub-circuit, the third positive gate driving sub-circuit, and the fourth positive gate driving sub-circuit are electrically connected to the same corresponding scanning line, which is further electrically connected to two adjacent rows of the pixel driving circuits in the first direction and located in a corresponding display partition of the display partitions; and at least one of the first negative gate driving sub-circuit, the second negative gate driving sub-circuit, the third negative gate driving sub-circuit, or the fourth negative gate driving sub-circuit is located on at least one side of the display area in the first direction; and one or two of the first negative gate driving sub-circuit, the second negative gate driving sub-circuit, the third negative gate driving sub-circuit, and the fourth negative gate driving sub-circuit are electrically connected to the same corresponding scanning line, which is further electrically connected to a row of pixel driving circuits in the first direction and located in the corresponding display partition.

19. The display device of claim 18, wherein a first non-display area in which at least one of the first positive gate driving sub-circuit, the second positive gate driving sub-circuit, the third positive gate driving sub-circuit, or the fourth positive gate driving sub-circuit is located is disposed in the first direction between the display area and an area in which the light emission driving sub-circuit is located; and at least one of the first negative gate driving sub-circuit, the second negative gate driving sub-circuit, the third negative gate driving sub-circuit, or the fourth negative gate driving sub-circuit is disposed in the first direction between the display area and the first non-display area.

20. The display device of claim 12, wherein the pixel driving circuit comprises:

a driving transistor;

a first light emission control transistor, wherein a first electrode of the first light emission control transistor is connected to a first power supply line, a second electrode of the first light emission control transistor is connected to a first electrode of the driving transistor, and a gate of the first light emission control transistor is connected to a light emission control line to receive a light emission control signal;

a second light emission control transistor, wherein a first electrode of the second light emission control transistor is connected to a second electrode of the driving transistor, and a gate of the second light emission control transistor is connected to the light emission control line;

a light emission device, wherein an anode of the light emission device is connected to a second electrode of the second light emission control transistor, and a cathode of the light emission device is connected to a second power supply line;

a first capacitor, wherein a first terminal of the first capacitor is connected to a gate of the driving transistor, and a second terminal of the first capacitor is connected to the first power supply line;

a writing transistor, wherein a first electrode of the writing transistor is connected to a data line, a second electrode of the writing transistor is connected to the first electrode of the driving transistor, a gate of the writing transistor is connected to a first scanning line to receive a corresponding positive gate driving signal according to a refresh frequency of a display partition in which the pixel driving circuit is located, and the writing transistor is an N-channel thin film transistor;

a compensation transistor, wherein a first electrode of the compensation transistor is connected to the second electrode of the driving transistor, a second electrode of the compensation transistor is connected to the gate of the driving transistor, and a gate of the compensation transistor is connected to the gate of the writing transistor;

a first initialization transistor, wherein a first electrode of the first initialization transistor is connected to a first initialization line, a second electrode of the first initialization transistor is connected to the gate of the driving transistor, and a gate of the first initialization transistor is connected to a first control line;

a second initialization transistor, wherein a first electrode of the second initialization transistor is connected to a second initialization line, a second electrode of the second initialization transistor is connected to the anode of the light emission device, a gate of the second initialization transistor is connected to a second control line to receive a corresponding negative gate driving signal according to the refresh frequency of the display partition, and the second initialization transistor is a P-channel thin film transistor; and a second capacitor, where a first terminal of the second capacitor is connected to the gate of the driving transistor, and a second terminal of the second capacitor is connected to the second control line;

wherein a switching frequency of the first light emission control transistor and a switching frequency of the second light emission control transistor remain unchanged at different refresh frequencies, and/or the switching time of each frame of the first light emission control transistor and the second light emission control transistor at different refresh frequencies is greater than or equal to the switching time of each frame of the first light emission control transistor and the second light emission control transistor at the refresh frequency of 60 Hz; the switching frequency of the second initialization transistor is greater than the switching frequency of the writing transistor; as the refresh frequency is decreased, the switching frequency of the second initialization transistor remains unchanged, and the switching frequency of the writing transistor, the switching frequency of the compensation transistor, and the switching frequency of the first initialization transistor are all decreased.

* * * * *